(12) United States Patent
Schillinger

(10) Patent No.: US 10,389,158 B2
(45) Date of Patent: Aug. 20, 2019

(54) DEVICE AND METHOD FOR CHARGING AN ELECTRICAL ENERGY STORE FROM A THREE-PHASE AC VOLTAGE SOURCE

(71) Applicant: Robert Bosch GmbH, Stuttgart (DE)

(72) Inventor: Bertram Schillinger, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 102 days.

(21) Appl. No.: 14/651,445

(22) PCT Filed: Dec. 2, 2013

(86) PCT No.: PCT/EP2013/075206
§ 371 (c)(1),
(2) Date: Jun. 11, 2015

(87) PCT Pub. No.: WO2014/095319
PCT Pub. Date: Jun. 26, 2014

(65) Prior Publication Data
US 2015/0311739 A1    Oct. 29, 2015

(30) Foreign Application Priority Data
Dec. 18, 2012 (DE) .......................... 10 2012 223 591

(51) Int. Cl.
*H02J 7/02* (2016.01)
*H02M 3/158* (2006.01)
(Continued)

(52) U.S. Cl.
CPC .............. *H02J 7/022* (2013.01); *B60L 53/24* (2019.02); *H02J 7/06* (2013.01); *H02M 1/4216* (2013.01);
(Continued)

(58) Field of Classification Search
CPC ...................................................... H02J 7/022
(Continued)

(56) References Cited

U.S. PATENT DOCUMENTS 4,258,304 A * 3/1981 Bourke ............... B60L 11/1811
                                                                   318/139
4,491,768 A * 1/1985 Slicker ............... B60L 11/1803
                                                                   318/139
(Continued)

FOREIGN PATENT DOCUMENTS

CN       102099992 A      6/2011
DE       19523576         2/1996
JP       2011182521 A     9/2011

OTHER PUBLICATIONS

International Search Report for Application No. PCT/EP2013/075206 dated Dec. 15, 2014 (English Translation, 1 page).
(Continued)

*Primary Examiner* — Jerry D Robbins
(74) *Attorney, Agent, or Firm* — Michael Best & Friedrich LLP

(57) ABSTRACT

The invention relates to a device (100) for charging an electrical energy store (B) from a three-phase AC voltage source (U1, U2, U3), said device having: —a converter device (20) electrically connected to the AC voltage source (U1, U2, U3) and with three half-bridges (H1, H2, H3), each having two series-connected switches (S1, S2; S3, S4; S5, S6), wherein an inductor (L1, L2, L3) is connected electrically between a respective node point of two switches (S1 . . . S6) of one of the half-bridges (H1, H2, H3) and a respective phase of the AC voltage source (U1, U2, U3); —a buck converter device (TS) electrically connected to an intermediate circuit capacitor (C1) of the converter device (20), wherein a switch (STS) of the buck converter device (TS) is cyclically switched in a charging mode of the device (100) and is open in a regular mode of the converter device (20); and —a switch (SF) by means of which the buck converter device (TS) can be bypassed in regular mode of the converter device (20); —wherein, depending on the
(Continued)

phase voltages of the AC voltage source (U1, U2, U3) and currents through the inductors (L1, L2, L3), the switch (STS) of the buck converter device (TS) and the switches (S1 . . . S6) of the half bridges (H1, H2, H3) of the converter device (20) can be switched by means of a control device (10) in such a manner that a charging current for the electrical energy store (B) drawn from the AC voltage source (U1, U2, U3) in order to charge the electrical energy store (B) is formed such that each phase current of the AC voltage source (U1, U2, U3) is substantially sinusoidal, the phase currents being substantially in phase with the corresponding phase voltages of the AC voltage source (U1, U2, U3).

10 Claims, 2 Drawing Sheets

(51) Int. Cl.
    *H02M 1/42*      (2007.01)
    *H02J 7/06*      (2006.01)
    *B60L 53/24*     (2019.01)
    *H02J 7/10*      (2006.01)

(52) U.S. Cl.
    CPC ..... *B60L 2210/30* (2013.01); *B60L 2240/526* (2013.01); *B60L 2240/527* (2013.01); *B60L 2240/529* (2013.01); *H02J 7/02* (2013.01); *H02J 2007/10* (2013.01); *H02M 3/1582* (2013.01); *Y02T 10/7005* (2013.01); *Y02T 10/7072* (2013.01); *Y02T 10/7241* (2013.01); *Y02T 10/92* (2013.01); *Y02T 90/127* (2013.01); *Y02T 90/14* (2013.01)

(58) Field of Classification Search
    USPC ........................................................ 320/107
    See application file for complete search history.

(56) References Cited

U.S. PATENT DOCUMENTS

| | | | |
|---|---|---|---|
| 4,920,475 A * | 4/1990 | Rippel | B60L 11/1803 363/132 |
| 5,099,186 A * | 3/1992 | Rippel | B60L 3/0023 318/105 |
| 5,291,388 A * | 3/1994 | Heinrich | B60L 11/1803 320/138 |
| 5,500,579 A * | 3/1996 | Kim | B60L 11/1803 307/10.1 |
| 5,504,414 A * | 4/1996 | Kinoshita | B60L 7/14 180/65.8 |
| 5,581,171 A * | 12/1996 | Kerfoot | B60L 11/1811 320/137 |
| 5,646,832 A | 7/1997 | Pulhamus, Jr. et al. | |
| 5,689,164 A * | 11/1997 | Hoft | H02P 25/0925 318/400.17 |
| 8,653,696 B2 * | 2/2014 | King | B60L 11/123 307/82 |
| 8,957,644 B2 * | 2/2015 | Mao | H02J 1/102 323/259 |
| 2007/0029881 A1 * | 2/2007 | Lai | H02J 9/062 307/82 |
| 2007/0289794 A1 * | 12/2007 | Ishikawa | B60K 6/26 180/165 |
| 2009/0121659 A1 * | 5/2009 | Oyobe | B60K 6/445 318/12 |

OTHER PUBLICATIONS

Sousa et al., "A combined multiphase electric drive and fast battery charger for Electric Vehicles," Vehicle Power and Propulsion Conference, 2010 IEEE, IEEE, Sep. 1, 2010, pp. 1-6.

* cited by examiner

DEVICE AND METHOD FOR CHARGING AN ELECTRICAL ENERGY STORE FROM A THREE-PHASE AC VOLTAGE SOURCE

BACKGROUND OF THE INVENTION

The invention relates to a device for charging an electrical energy store from a three-phase AC voltage source. The invention further relates to a method for charging an electrical energy store from a three-phase AC voltage source.

A known device for the three-phase charging of a battery comprises an active B6 bridge connected to the three-phase AC voltage source for implementing a reactive current compensation device or power factor correction device and a buck converter connected thereto. A further B6 bridge is connected to the buck converter.

The German patent publication DE 195 235 76 A1 describes an AC-DC power supply and a method for converting an AC voltage into a DC voltage in high voltage systems. The AC-DC power supply described here comprises a semiconductor switch, which has a lower breakdown voltage on a low-voltage side of the flyback converter than a semiconductor switch on a high-voltage side. The lower breakdown voltage can be achieved by means of a shunt regulator which regulates a clamping voltage on the low-voltage switch side.

SUMMARY OF THE INVENTION

According to a first aspect, the invention provides a device for charging an electrical energy store from a three-phase AC voltage source, said device having:
  a converter device electrically connected to the AC voltage source and with three half-bridges, each having two series-connected switches, wherein an inductor is connected electrically between a respective node point of two switches of one of the half-bridges and a respective phase of the AC voltage source; and
  a buck converter device electrically connected to an intermediate circuit capacitor of the converter device, wherein a switch of the buck converter device is cyclically switched in a charging mode of the device and is open in a regular mode of the converter device; and
  a switch by means of which the buck converter device can be bypassed in a regular mode of the converter device;
  wherein, depending on the phase voltages of the AC voltage source and currents through the inductors, the switch of the buck converter device and the switches of the half-bridges of the converter device can be switched by means of a control device in such a manner that a charging current for the electrical energy store drawn from the AC voltage source in order to charge the electrical energy store is formed such that each phase current of the AC voltage source is substantially sinusoidal, the phase currents being substantially in phase with the corresponding phase voltages of the AC voltage source.

According to a second aspect of the invention, a method for charging an electrical energy store from a three-phase AC voltage source is provided, which comprises the following steps:
  boosting of all of the voltage phases of the AC voltage source as required by means of a converter device such that an electrical voltage level of an intermediate circuit of the converter device is higher than an electrical voltage level of the electrical energy store, wherein switches of the converter device are actuated in such a manner that the phase currents of AC voltage source are substantially sinusoidal, and wherein the phase currents of the AC voltage source are substantially in phase with the phase voltages of said AC voltage source; and
  generating a charging current for the electrical energy store by means of cyclically actuating a buck converter device electrically connected to a capacitor of the converter device.

A preferred embodiment of the device is characterized in that the phase currents of the AC voltage source in the charging mode of the converter device are formed in such a way that a torque is not exerted on a motor connected to the converter device. This has the advantage that currents for the connected electric motor can be favorably adjusted in the charging mode by utilizing mathematical methods in the form of a Clarke transformation.

A further preferred embodiment of the device according to the invention is characterized by the fact that the switch of the buck converter device is a unidirectionally conductive semiconductor switch which allows a current to pass only in the direction of the energy store. An efficient charging operation for the battery is thereby advantageously supported.

A further preferred embodiment of the invention of the device according to the invention is characterized by the fact that the switch of the buck converter device is cyclically switched in a pulse width modulated manner in the charging mode of the converter device. In this way, a charging current can be advantageously adjusted by means of a proven clocking method.

A further preferred embodiment of the invention is characterized by the fact that the switch bypassing the buck converter device is a contactor or a semiconductor switch. As a result, an alternative option for the aforementioned switch is provided.

A further preferred embodiment of the device according to the invention is characterized by the fact that the intermediate circuit capacitor of the converter device is designed as a temporary buffer store for the current regulator device. As a result, a capacitor is saved because the capacitor of the converter device is also used in an enhanced manner for the charging operation.

An advantageous modification to the method according to the invention is characterized by the fact that a duty cycle of the switch of the buck converter device is configured according to the requirements of a charging state of the electrical energy store. In this way, a charging current for the electrical energy store can be advantageously dimensioned as a function the requirements.

A further advantageous modification to the method according to the invention is characterized by the fact that the switch of the buck converter device is only actuated in a charging mode of the electrical energy store, wherein the switch is open in a regular mode of the converter device and wherein the buck converter device is bypassed by means of a switch. Hence, a separation of the buck converter device advantageously results in regular mode of the converter device, wherein the buck converter device is bypassed.

A particularly advantageous aspect of the invention is that a converter device, which is already present, is used very effectively. This results from the fact that the converter device is used for the regular drive mode as well as for the charging mode. In addition, an additional intermediate circuit capacitor can be saved by using the converter-internal capacitor. In this way, the converter device together with coupling inductors implements a correction functionality in the sense of a power factor correction which is mandatory for compliance with EN-network standards.

As a result, an efficient and cost effective three-phase charging of an electrical energy store can thereby be advantageously implemented by means of the converter device and the downstream buck converter device.

It is further considered to be advantageous that the inventive principle can be used in a broad input voltage range and battery voltage range by using the converter device as a boost converter in conjunction with the downstream buck converter device. In this way, a charging concept is implemented which can be used throughout the world.

BRIEF DESCRIPTION OF THE DRAWINGS

Further features and advantages of the present invention are explained below with the aid of embodiments which refer to the figures in the drawings. In so doing, all described or depicted features in isolation or in any arbitrary combination form the subject matter of the invention, independently of their synopsis in the patent claims or the retroactive application thereof as well as independently of their formulation or, respectively, depiction in the description or in the figures of the drawings. The figures are primarily intended to illustrate the principles essential to the invention and are not necessarily to be understood as schematics that are accurate in every detail. In the drawings, identical reference signs denote identical or functionally identical elements.

In the drawings.

DETAILED DESCRIPTION

Figure 1:
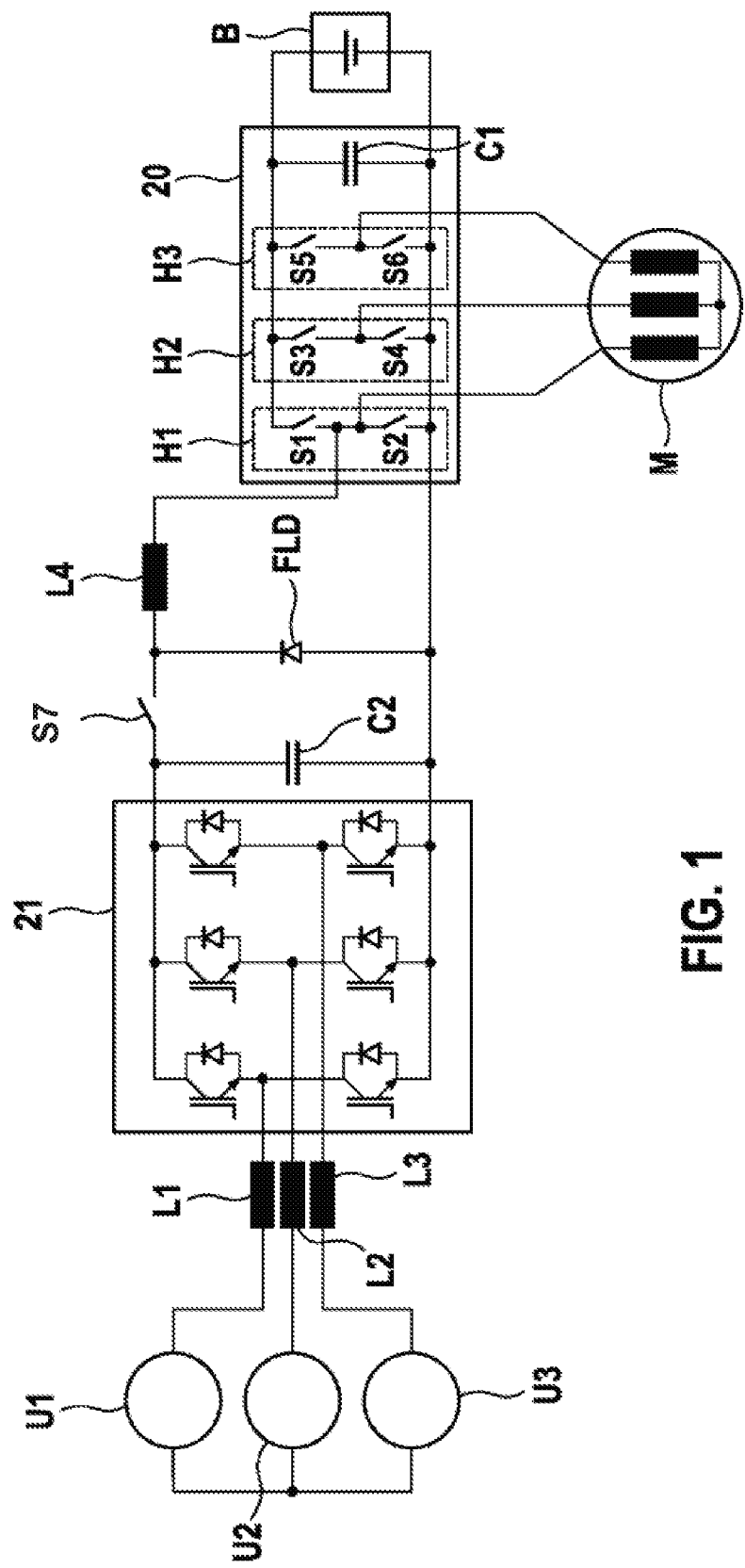
FIG. 1 shows an exemplary device for the three-phase charging of an electrical energy store.

FIG. 1 shows an exemplary device for the three-phase charging or an electrical energy store B (e.g. a rechargeable battery or an accumulator) in a broad input voltage range. A three-phase input AC voltage U1, U2, U3 (e.g. rotary current) is boosted or, respectively, raised to a higher intermediate circuit voltage level by means of an active bridge circuit means 21 in the form of a B6 bridge circuit. The inductors L1, L2, L3 are decoupling inductors for controlling the phase currents in the phase voltages of the AC voltage source.

A bridge circuit means 21 comprising in each case two semiconductor switches connected in series implements a required PFC functionality (power factor correction) for maintaining predefined limit values with regard to harmonics. A downstream intermediate circuit capacitor C2 smoothes voltage ripples that are present.

A downstream buck converter comprising a longitudinal switch S7 is used as a current regulator for the charging of the electrical energy store. The voltage level of the intermediate circuit voltage is reduced in accordance with the charging requirements of the electrical energy store B by means of the buck converter.

The electrical coupling of the charging circuit to the electrical energy store B takes place by means of a converter device 20, which is likewise designed as an active B6 bridge circuit. In this case, the charging current then flows via free-wheeling diodes (not depicted) of the high-side switches S1, S3, S5 of the converter device 20.

According to the invention, provision is now made for the converter device 20 to be utilized in an enhanced manner for the three-phase charging of the electrical energy store B.

Figure 2:
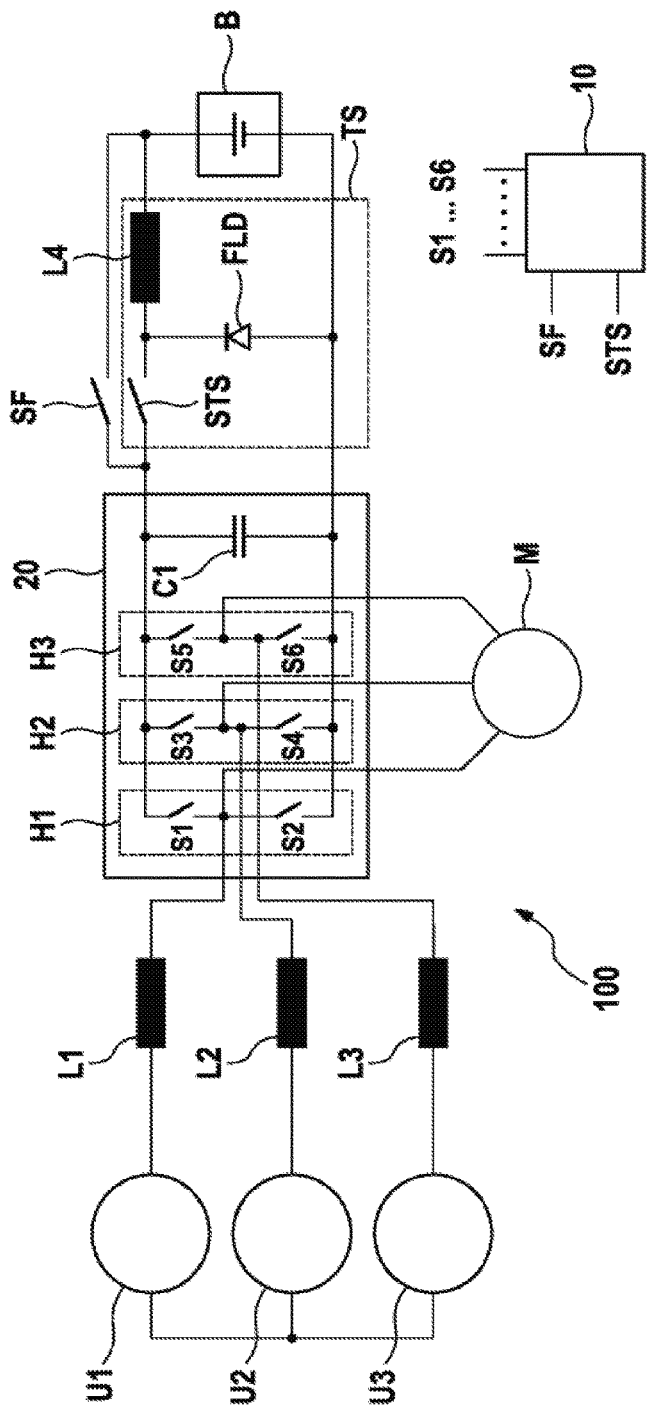
FIG. 2 shows a first embodiment of the device according to the invention.

FIG. 2 shows a basic schematic diagram of a first embodiment of the device 100 according to the invention.

Between respectively one of the three phase voltages U1, U2, U3, respectively one coupling inductor L1, L2, L3 is connected electrically to a node point of two switches S1 . . . S6 of the three half-bridges H1, H2, H3 of the converter device 20.

An electric motor M is connected to the node points of respectively two switches S1 . . . S6 of the half-bridges H1, H2, H3 of the converter device 20, wherein the electric motor M is supplied via the converter device 20 with electrical energy from the electrical energy store B in a regular drive mode.

A buck converter device or, respectively, a current regulator device TS is connected electrically to an intermediate circuit capacitor C1 of the converter device 20, wherein the buck converter device TS has a longitudinal switch STS, a low-pass inductor L4 and a free-wheeling diode FLD. The intermediate circuit capacitor C1 is preferably configured or dimensioned as an electrical charge buffer store for the buck converter device TS.

In a charging mode of the converter device 20, measured values and temporal profiles of the three phase voltages, the phase currents and charging current (battery charging current) through the inductor L4 are supplied to a control device 10 via current and voltage sensors (not depicted). On the basis of the aforementioned parameters, the switches S1 . . . S6 are switched by means of the control device 10 in such a manner that the three phase currents are substantially in phase with the respective phase voltages U1, U2, U3 and are formed substantially sinusoidally. In an advantageous manner, all six switches S1 . . . S6 of the converter device 20 are symmetrically and uniformly loaded by means the aforementioned method of operation.

The converter device 20 functionally implements a boost converter topology which implements a boosting of a voltage level of the input AC voltage above a voltage level of the electrical energy store B.

As a result, the converter device 20 together with the inductors L1 . . . L3 take on according to the invention a functionality as a correction means according to the principles of a power factor correction.

Ultimately, this means an ohmic behavior is provided in the three phases U1, U2, U3 of the three-phase AC voltage source, which advantageously results in a small emission of harmonics into the three-phase AC power supply voltage. In this way, a current profile is provided which is synchronous to every power supply voltage.

A summary charging current for the electrical energy store B, which preferably does not exceed a defined maximum value, is furthermore generated in the charging mode by means of the switch STS of the buck converter device TS. This is achieved by a clocked actuation of the switch STS (e.g. a pulse width modulated clocking) of the buck converter device, wherein current flows across the inductor L4 are periodically interrupted by the unidirectionally conductive switch STS being cyclically switched. For that reason, a free-wheeling diode FLD is provided which enables current to flow across the inductor L4 into the electrical energy store B at defined time intervals.

In the regular motor mode or drive mode of the converter device 20, the switch bypassing the buck converter device TS is closed and the three-phase AC voltage source U1, U2, U3 is separated from the converter device 20. The switch SF can thereby be designed as an electromechanical contactor or as a semiconductor switch. The electric motor M is actuated according to the intended drive mode. During the charging operation, the switch SF is open and the switch STS is cyclically switched in order to generate the charging current for the electrical energy store B.

Ultimately, the converter device 20 is thus connected directly to the three-phase AC voltage source U1, U2, U3 and is actuated in accordance with an implementation of a PFC functionality.

During the charging operation, the three phase currents of the motor current are converted in accordance with the mathematical principals of the Clarke transformation into a two phase system with an active and a reactive component ($I_q=0$, $I_d>0$), whereby a torque is advantageously not generated in the electric motor M. Hence, the electric motor M is advantageously stopped in the charging mode.

When the charging operation is completed, the converter device 20 is separated from the three-phase AC voltage source U1, U2, U3; the switch STS is permanently open and the switch SF is closed.

As a result, a simple switching between a drive mode and a charging mode of the converter device 20 can ultimately be carried out.

Figure 3:
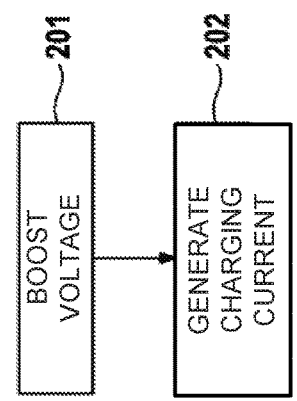
FIG. 3 shows a basic depiction of a flow diagram of an embodiment of the method according to the invention.

FIG. 3 shows a basic flow diagram of an embodiment of the method according to the invention.

In a first step 201, all voltage phases of the AC voltage source U1, U2, U3 are boosted as required by means of a converter device 20 such that an electrical voltage level of an intermediate circuit of the converter device 20 is higher than an electrical voltage level of the electrical energy store B, wherein switches S1 . . . S6 of the converter device 20 are actuated in such a manner that the phase currents of the AC voltage source U1, U2, U3 are substantially sinusoidal, and wherein the phase currents of the AC voltage source U1, U2, U3 are substantially in phase with the phase voltages of said AC voltage source U1, U2, U3.

In a second step 202, a charging current is generated for the electrical energy store B by means of the clocked actuation of a buck converter device TS that is electrically connected to a capacitor C1 of the converter device 20.

It is advantageously possible by means of the device according to the invention and the method according to the invention to map a particularly great amount of functionality in a single converter device designed as a B6 bridge. In addition, a three-phase charging of the battery is made possible by means of the converter device, which is directly, i.e. without an intermediate circuit connected therebetween, connected to the three-phase AC voltage source.

In an advantageous manner, it is therefore possible by means of the present invention to make better use of the already present converter device 20, whereby hardware and hence space and costs can be saved.

Although the present invention was described with the aid of preferred exemplary embodiments, it is not limited to said embodiments. The person skilled in the art will therefore be able to modify the previously described features of the invention or combine them with one another without departing from the gist of the invention.

The invention claimed is:

1. A device (100) for charging an electrical energy store (B) from a three-phase AC voltage source (U1, U2, U3), said device having:
    a converter device (20) electrically connected to the AC voltage source (U1, U2, U3) and with three half-bridges (H1, H2, H3), each having two series-connected switches (S1, S2; S3, S4; S5, S6), wherein an inductor (L1, L2, L3) is connected electrically between a respective node point of two switches (S1 . . . S6) of one of the half-bridges (H1, H2, H3) and a respective phase of the AC voltage source (U1, U2, U3); and
    a buck converter device (TS) electrically connected to an intermediate circuit capacitor (C1) of the converter device (20), wherein a switch (STS) of the buck converter device (TS) is connected to the converter device (20) and to a diode (FLD) and an inductor (L4) and is cyclically switched in a charging mode of the device (100) and is open in a regular mode of the converter device (20); and
    a switch (SF), connected between the converter device (20) and the electrical energy store (B), and by which the buck converter device (TS) can be bypassed in regular mode of the converter device (20);
    wherein, depending on the phase voltages of the AC voltage source (U1, U2, U3) and currents through the inductors (L1, L2, L3), the switch (STS) of the buck converter device (TS) and the switches (S1 . . . S6) of the half-bridges (H1, H2, H3) of the converter device (20) can be switched by a control device (10) such that a charging current for the electrical energy store (B) drawn from the AC voltage source (U1, U2, U3) in order to charge the electrical energy store (B) is formed such that each phase current of the AC voltage source (U1, U2, U3) is substantially sinusoidal, the phase currents being substantially in phase with the corresponding phase voltages of the AC voltage source (U1, U2, U3);
    wherein the switch (SF) is open in the charging mode; and
    wherein current does not flow through the inductor (L4) of the buck converter device (TS) in the regular mode.

2. The device according to claim 1, characterized in that the phase currents of the AC voltage source (U1, U2, U3) are formed in the charging mode of the converter device (20) such that a torque is not exerted on a motor (M) connected to the converter device (20).

3. The device according to claim 1, characterized in that the switch (STS) of the buck converter device (TS) is a unidirectionally conductive semiconductor switch which allows a current to pass only in the direction of the energy store (B).

4. The device according to claim 1, characterized in that the switch (STS) of the buck converter device (TS) is cyclically switched in a pulse width modulated manner in the charging mode of the converter device (20).

5. The device according to claim 1, characterized in that the switch (SF) bypassing the buck converter device (TS) is a contactor.

6. The device according to claim 1, characterized in that the intermediate circuit capacitor (C1) of the converter device (20) is designed as a temporary buffer store for the buck converter device (TS).

7. The device according to claim 1, characterized in that the switch (SF) bypassing the buck converter device (TS) is a semiconductor switch.

8. A method for charging an electrical energy store (B) from a three-phase AC voltage source (U1, U2, U3), comprising the steps:
    boosting all voltage phases of the AC voltage source (U1, U2, U3) as required by a converter device (20) such that an electrical voltage level of an intermediate circuit of the converter device (20) is higher than an electrical voltage level of the electrical energy store (B), wherein switches (S1 . . . S6) of the converter device (20) are actuated in such a manner that the phase currents of the AC voltage source (U1, U2, U3) are substantially sinusoidal, and wherein the phase currents of the AC voltage source (U1, U2, U3) are substantially in phase with the phase voltages of the AC voltage source (U1, U2, U3); and generating a charging current for the electrical energy store (B) by a clocked actuation of a buck converter device (TS) connected electrically to a capacitor (C1) of the converter device (20); and wherein a switch (STS) of the buck converter device (TS) is connected to the converter device (20) and to a diode (FLD) and an inductor (L4) and is actuated only in a charging state of the electrical energy store (B), the switch (STS) being open in a regular mode of the converter device (20) and the buck converter device (TS) is bypassed by a switch (SF) connected between the converter device (20) and the electrical energy store (B);

wherein the switch (SF) is open in the charging mode; and wherein current does not flow through an inductor (L4) of the buck converter device (TS) in the regular mode.

9. The method according to claim 8, wherein a duty cycle of the switch (STS) of the buck converter device (TS) is configured according to the requirements of a charging state of the electrical energy store (B).

10. A non-transitory computer readable medium containing a computer program comprising program code for carrying out the method according to claim 8, when said computer program is run in an electronic control device (10).

* * * * *